Oct. 21, 1969 R. W. LUEBKE 3,473,786
FENCING FOR CONTROLLING ACCUMULATION AND DRIFTING OF SNOW, SAND OR OTHER HEAVIER-THAN-AIR PARTICLES SUSPENDED IN AIR CURRENTS
Filed June 30, 1967 3 Sheets-Sheet 1
Fig. 1.
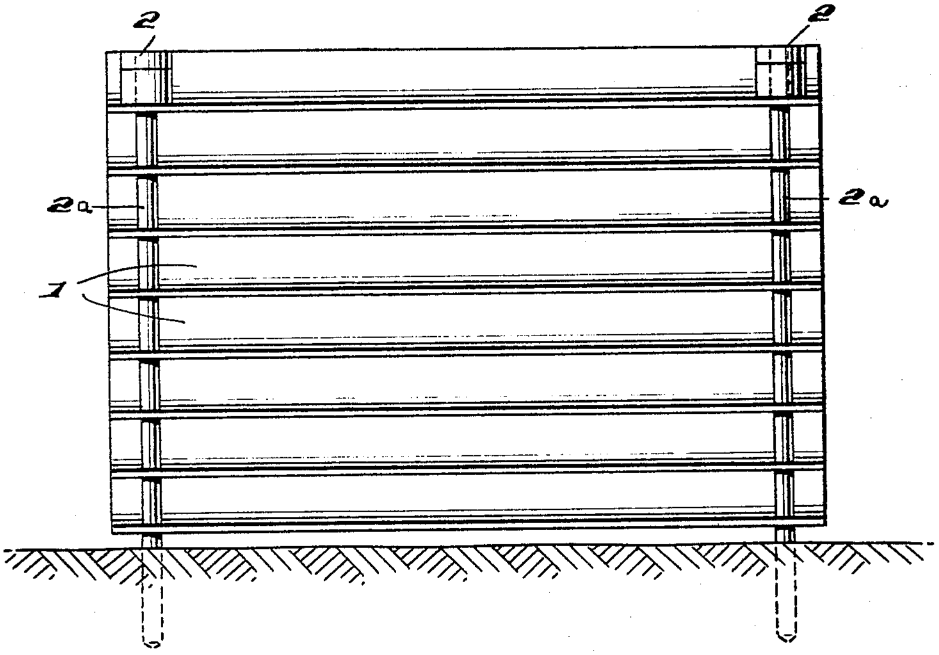
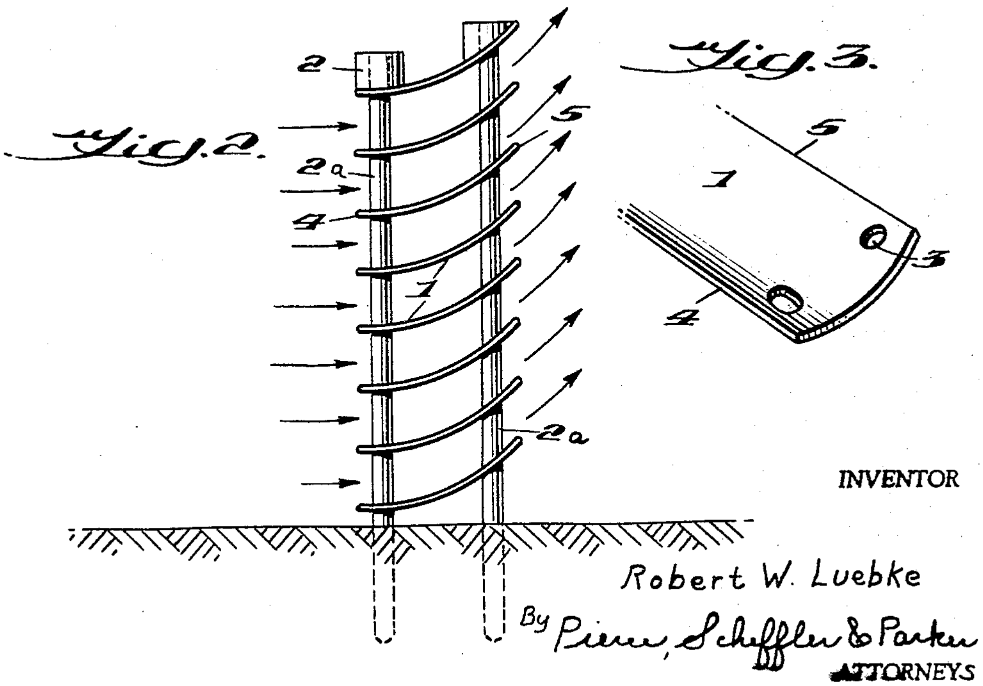
Fig. 2. Fig. 3.
INVENTOR
Robert W. Luebke
By Pierce, Scheffler & Parker
ATTORNEYS FENCING FOR CONTROLLING ACCUMULATION AND DRIFTING OF SNOW, SAND OR OTHER HEAVIER-THAN-AIR PARTICLES SUSPENDED IN AIR CURRENTS Filed June 30, 1967 3 Sheets-Sheet 2

INVENTOR
Robert W. Luebke

BY Pierce, Scheffler & Parker
ATTORNEYS

FENCING FOR CONTROLLING ACCUMULATION AND DRIFTING
OF SNOW, SAND OR OTHER HEAVIER-THAN-AIR
PARTICLES SUSPENDED IN AIR CURRENTS

Filed June 30, 1967 3 Sheets-Sheet 3

INVENTOR
Robert W. Luebke

BY Pierce, Scheffler & Parker
ATTORNEYS

United States Patent Office 3,473,786

Patented Oct. 21, 1969

3,473,786

FENCING FOR CONTROLLING ACCUMULATION AND DRIFTING OF SNOW, SAND OR OTHER HEAVIER-THAN-AIR PARTICLES SUSPENDED IN AIR CURRENTS

Robert W. Luebke, 303 E. Highfield Road, Baltimore, Md. 21218

Filed June 30, 1967, Ser. No. 650,365
Int. Cl. E01f 7/02
U.S. Cl. 256—12.5 8 Claims

ABSTRACT OF THE DISCLOSURE

Protective fencing for use in protecting a right-of-way against accumulation thereon of airborne particles such as snow, sand and the like comprises a plurality of horizontally arranged smoothly and upwardly curved vanes having a relatively slow rate of curvature. The vanes are arranged each above the other with the trailing edge of one vane being located at least as high as the leading edge of the vane next above to ensure complete upward deflection of the incident air stream which serves to maintain the particles in suspension over the area desired to be protected against precipitation.

The vanes may be made throughout of a relatively rigid material and can be stationary, or they can be arranged for pivotal movement around a horizontal axis to maintain efficiency for any change in angle of attack of the air stream on the vanes. Compensation for a change in angle of attack of the air stream can also be achieved by using a stationary vane provided with rigid leading and trailing edge portions and a mid-portion made of a flexible material which undergoes deflection with a change in the angle of attack.

This invention relates to an improved device for scientifically controlling the accumulation and drifting of snow, sand, or other heavier-than-air particles suspended in the air currents. This improved control is developed by creating, over a specified area, aerodynamic forces of sufficient magnitude to overcome the force of gravity or the inertia forces created during changes in air current direction. The aerodynamic forces are created by smoothly changing the vertical direction of the wind over the specified area in accordance with the invention.

Prior developed techniques have protected areas with snow fences, tree lines, shrubs, etc., which block the smooth flow of air some distance upwind from the area to be protected. This blockage creates low velocity areas downwind of the fencing and allows gravity and particle inertia forces to precipitate the particles from the air stream before they reach the area to be protected. The inertia forces will cause particle precipitation when the wind velocity vector changes direction more rapidly than can the particle under the influence of the aerodynamic forces caused by the change. The gravity forces will cause precipitation when the wind velocity and direction are reduced to the point where the vertical component of aerodynamic drag on the particle is less than the force of gravity. Present fencing, tree lines, shrub lines, etc., by virtue of their method of operation must be placed some distance away from the protected area. This distance is dependent on the expected amount of local snowfall, and the expected duration of local winds. Both quantities are extremely difficult to predict from year to year. Any inaccuracy in placement could allow the drift or accumulation to grow until it covers the area to be protected with large drifts. The offset distances mentioned above usually require that the fences be located off the railway or highway right-of-way thus requiring annular installation and tear-down of the protective fencing.

SUMMARY OF THE INVENTION

In accordance with the invention, the improved protective fencing comprises an assembly of curved vanes which are superimposed one above the other and which function to impart an aerodynamic lift to the particles entrained in the wind. The vanes have a minimum radius of curvature designed to prevent the particles from striking the vane surfaces and falling out and the turn angle of the wind through the vanes is designed to cause the entrained particles to be carried up and over the right-of-way.

The principal object of the present invention is to provide an improved structure for protective fencing of the character described which overcomes the various disadvantages inherent in prior developed structures intended to serve this purpose.

More particularly, it is a primary object of the invention to provide protective fencing for the control of snow, sand or other airborne particles having a high degree of efficiency and which is independent of the quantity of the particles acted upon by the air currents.

A further object is to provide an improved protective fencing for airborne particles which is independent of wind velocity as well as its direction and duration.

Still another object is to provide an improved protective fencing for airborne particles which by virtue of its mode of operation can be installed immediately adjacent a railway or highway right-of-way thus making it feasible to leave the fencing permanently in place rather than having to install and remove it on a seasonable basis.

A more specific object of the invention is to provide an improved protective fencing for air entrained wind-blown particles which includes horizontally disposed curved vanes serving to provide an aerodynamic lift to the air currents which maintain the particles in suspension across the area desired to be protected.

The foregoing as well as other objects and advantages inherent in the invention will become more apparent from the following detailed description of various suitable embodiments thereof and from the accompanying drawings in which such embodiments are illustrated.

FIG. 1 of the drawings is a front elevation of a section of the improved protective fencing wherein the curved vanes are both rigid and stationary;

FIG. 2 is a view in end elevation of the fencing shown in FIG. 1;

FIG. 3 is a perspective, fragmentary view of one of the curved vanes of the fencing of FIG. 1;

Figure 4:
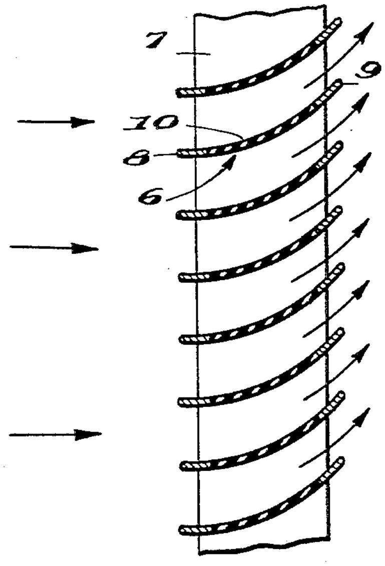
FIG. 4 is a view in vertical transverse section of a somewhat different embodiment of fencing in accordance with the invention wherein the curved vanes are essentially stationary and include leading and trailing edge portions made of rigid material and an intermediate portion made from a flexible material.

Before proceeding to describe these various embodiments of the invention in detail, it is believed that a discussion of the various physical laws involved in the behavior of airborne particles will be conducive to a better understanding of the improved protective fencing structure in accordance with the invention.

Snow, sand, or other heavier-than-air particles can remain in suspension only when the relative wind velocity past the particles creates a drag force on the particle of sufficient magnitude and direction to overcome the force of gravity or the inertial forces created by rapid changes in direction of the air stream.

The aerodynamic forces vary as the square of the relative velocity and the cross-sectional area of the particle perpendicular to the flow. To maintain the particle in suspension against the force of gravity, the wind velocity vector must be changed in a generally upward direction such that the aerodynamic forces on the particle are equal to or greater than the force of gravity. This change must be made slowly so that inertia forces do not precipitate the particle. To protect a specific area, the wind velocity vector must be changed to counteract any downward wind direction and in addition, impart the necessary vertical aerodynamic forces on the particle.

The turning angle required to provide the necessary aerodynamic forces is found by developing the relationships for suspended particle motion as follows:

The vertical force on a heavier-than-air particle in suspension can be given by, $$F=D \text{ Sin } \alpha - W \quad (1)$$

wherein:

F=net force on the particle
D=aerodynamic drag force
W=particle weight
$\alpha$=wind angle with respect to the horizontal.

To maintain particle suspension, the net force must be greater than or equal to zero.

The angle $\alpha$ is the amount that the downwind airflow angle must be greater than the upwind angle with respect to the horizontal to maintain the required suspension over the area to be protected downwind of the fence.

The lateral movement of the particle and hence the time required to traverse the area to be protected is given by $$t=\frac{l}{V \text{ Cos } \alpha} \quad (2)$$

wherein:

$t$=transversal time
$l$=length of area to be protected downwind of the fence
V=wind velocity
$\alpha$=is as before.

Substituting Equations 1 and 2 into the familiar expressions relating distance, time, and acceleration, the vertical path of the particle downwind of the fence is given by $$y=\left(\frac{D \text{ Sin } \alpha - W}{2W/g}\right)\left(\frac{l}{V \text{ Cos } \alpha}\right)^2 \quad (3)$$

wherein:

$g$=acceleration due to gravity
$y$=vertical movement of the particle over the protected area.

Substituting the familiar aerodynamic relationships for drag, and rewriting Equation 3 we get $$y=\left[\frac{C_D s_a V^2 \text{ Sin } \alpha}{4 s_p T} - \frac{1}{2}\right]\frac{g l^2}{(V \text{ Cos } \alpha)^2} \quad (4)$$

wherein:

$s_a$=air density
$s_p$=particle density
T=particle thickness
$C_D$=drag coefficient based on the frontal area of the particle.

Inspection of Equation 4 reveals that for particle suspension to be maintained over a specified area, $y$ must be equal to zero as a minimum requirement. This requirement can only be met if the terms inside the bracket in Equation 4 equal zero. Setting the terms equal to zero and solving for $\alpha$ yields the minimum turning angle required to maintain suspension of the particle. Therefore:

$$\alpha_{\min}=\text{Sin}^{-1}\left\{\frac{2 s_p T}{C_D s_a V^2}\right\} \quad (5)$$

Since $\alpha$ has been defined as the net downwind angle, the absolute turning angle required by the control fence is $$\alpha=\text{Sin}^{-1}\left\{\frac{2 s_p T}{C_D s_a V^2}\right\}+\beta \quad (6)$$

wherein:

$\beta$=the incident or upwind air flow angle with respect to the horizontal. The direction into the ground is positive for Equation 6.

The required aerodynamic forces generated in accordance with the above will be maintained as long as the redirected air flow from the fence impinges on the free stream flow over the top of the fence. Hence, the fence height is a function of the area, or more correctly, the downwind dimension of the area to be protected. The necessary relationship is given by $$h=l \tan \gamma \quad (7)$$

wherein:

$h$=required fence height
$l$=downwind dimension of the area to be protected
$\gamma$=absolute turn angle of the fence structure with respect to the horizontal.

The maximum rate of change and hence the minimum radius of curvature that can be used in the fence structure is limited by the ability of the suspended particle to follow the air flow. The inertia of the particle and the aerodynamic forces generated by the fence structure combine to define the minimum radius of curvature. The required relationship is given by:

$$R_{\min.}=\frac{2 s_p T}{C_D s_a} \quad (8)$$

wherein:

$R_{\min.}$=minimum vane radius of curvature
$s_p$=particle density
$s_a$=air density
$C_D$=drag coefficient based on particle frontal area
T=particle thickness.

With reference now to the embodiment of the improved protective fencing as illustrated in FIGS. 1–3, it is seen to be comprised of a vertical assembly of a plurality of generally horizontal curved vanes 1 made of any suitable and preferably corrosion resistant metal such as aluminum or galvanized steel so as to enable the fencing to be left permanently in place the year round as distinguished from the customary practice of erecting the fencing in the fall of the year and removing it after the winter has passed. Each section of the fencing is supported by headed posts 2 driven into the ground and the ends of the vanes 1 are provided with front and back holes 3 as indicated in FIG. 3 and through which the posts 2 extend. To support the vanes on the posts in their proper positions, one above the other spacer elements 2*a* or the like are located on the posts between adjacent vanes. Each fence section can be made as long as is practical and the sections will be erected in end-to-end relation for the length of the road, for example, desired to be protected.

As seen in FIG. 2, the essentially rigid and stationary vanes are smoothly curved in an upward direction from leading to trailing edge and have a slow rate-of-change of curvature in order to keep the particle inertia forces from causing precipitation and hence, accumulation. All of the vanes may have the same curvature, or the vane curvature may vary in accordance with their height from the ground. The leading edge 4 of each blade lies at the same general level as the trailing edge 5 of the blade next-below so as to ensure deflection upward of the complete incident air stream laden with the particles desired to be maintained in suspension across the road, or railway track or other area desired to be protected against accumulation of the snow or other particles.

The optimum turn angle of the stationary vanes would be as established by Equation 6 and would be set as a function of the minimum drifting velocity and lightest snow particle of concern in the particular locality in which the fence is to be installed. Generally, this angle will be around 30° in the United States and Canada for snow-control fencing. Sand or other particle control would require other angles depending upon the particle density, its shape and drifting wind velocity.

The optimum height of the fencing would be established in accordance with Equation 7 and is specified by the minimum drift velocity which sets the turn angle required, and the downwind dimension of the area requiring protection. Inspection of Equations 6 and 7 shows that as the wind velocity increases, with a constant turn angle, the downstream dimension of the protected area increases rapidly. Hence, the rigid vane fencing of FIGS. 1–3 becomes more efficient as the wind velocity increases. The efficiency of the rigid vane form of fencing, however, decreases with changes in the vertical component of the incident air flow angle which cause an increased incident downdraft.

Figure 5:
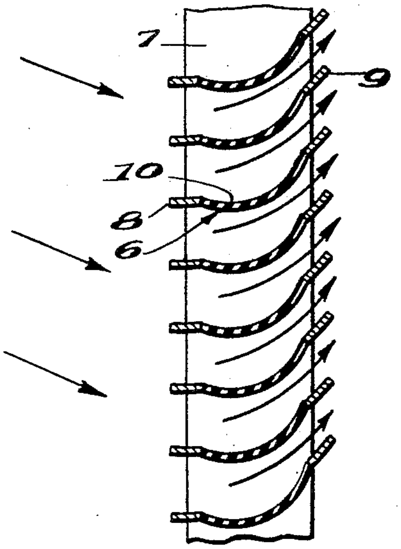
FIG. 5 is a view similar to FIG. 4 but showing the intermediate, flexible portions of the vanes distorted to a sharper curvature from their normal contour as a result of a change in the angle of attack of the wind on the vanes.

To maintain efficiency of the fencing under variations in wind velocity, one may utilize a flexible vane structure depicted in FIGS. 4 and 5 as contrasted with the rigid vane structure of FIG. 1. The flexible vane structure 6 is also smoothly curved in the upward direction and supported by vertical end members 7. The leading and trailing edge sections 8 and 9 of each vane are made from a rigid material such as the aluminum, previously mentioned, but the mid-section 10 of each vane is made from a flexible material such as rubber and which is yet under sufficient tension to maintain the minimum velocity turn angle when $\beta$ of Equation 6 is zero. As the wind angle $\beta$ changes, the angle of attack of the vane with respect to the air stream changes, thus causing a change in the center of pressure and a change in the air pressure exerted on the vane. Under the action of these changes, the flexible vane material 10 deflects, thereby changing the turn angle of the vane from the undeflected position shown in FIG. 5 to the deflected position shown in FIG. 6, as an example.

Figure 6:
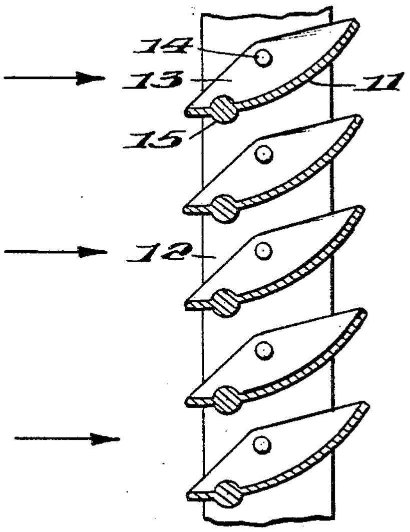
FIG. 6 is a view in vertical transverse section of another embodiment of fencing according to the invention wherein the curved vanes are rigid throughout their curvature from leading to trailing edges but are mounted for pivotal movement about a horizontal axis and weighted so as to adopt different angles of repose for different angles of attack of the wind on the vanes.
Figure 7:
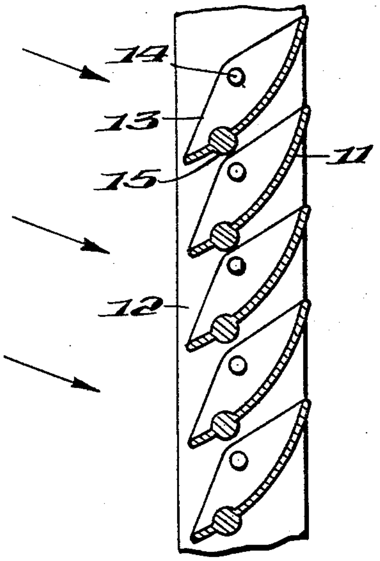
FIG. 7 is a view similar to FIG. 6 but showing the vanes of the fencing at a steeper angle as a result of a change in angle of attack.

Another structural form of the improved protective fencing in accordance with the invention and which maintains its efficiency under varying conditions of wind velocity is illustrated in FIGS. 6 and 7. Here it will be seen that the uniformly curved vanes 11 are made throughout from a rigid material such as aluminum, as in the case of the structure of FIG. 1 but are pivotally mounted to the support posts 12 at their ends by means of end plates 13 and trunnions 14. The vanes are individually biased, with regard to their angular position, such that at minimum drift velocity, the proper turning angle is generated by a balance of gravity or mechanical and aerodynamic forces. In the illustrated embodiment, the necessary biasing is established by weights 15 located eccentrically but this biasing can just as well be established by other equivalent means such as a spring.

As the wind velocity changes, each moveable vane 11 automatically changes its turn angle with respect to the horizontal as shown, for example, in FIG. 7 by virtue of the changed center of pressure and changed forces which obtain, as previously discussed in reference to the flexible vane structure illustrated in FIGS. 4 and 5. The changes are maintained automatically and, in general, close to the requirements of Equation 6 by location of the eccentrically placed weight 15, or by the spring characteristic of a control spring if used in lieu of weighting.

In all of the illustrated embodiments, the vane structure is shown to have uniform thickness throughout its dimension between its leading and trailing edges. However, this is not a rigid requirement and can be departed from in various respects. Thus, the vanes may be reinforced by transverse stiffeners or lugs or by longitudinal beading at the leading and/or trailing edges or may have the configuration of an air foil in transverse section, the blunt end of the air foil being located at the leading edge of the vane or the vanes may be composed of short flat segments each bent up slightly from the next to produce a substantantially, nearly smooth curvature.

Figures 8, 9:
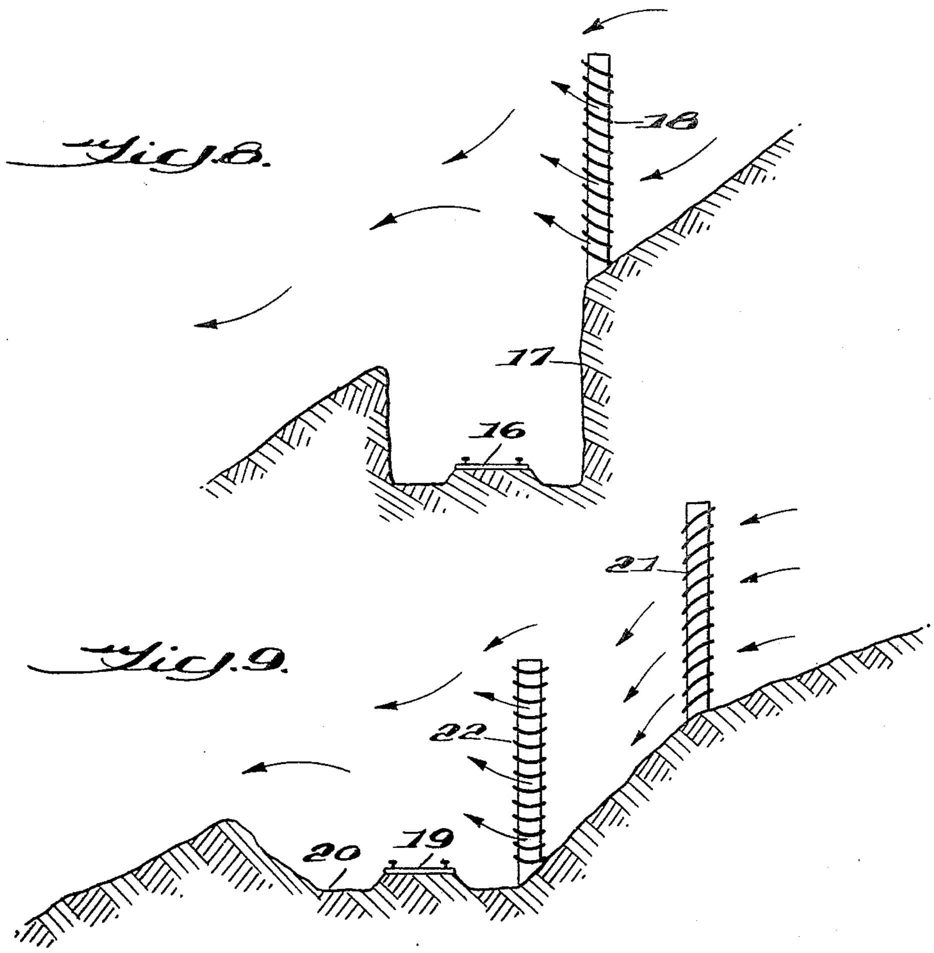
FIGS. 8, 9 and 10 are somewhat diagrammatic views illustrating different installations of the improved fencing to suit different situations in terrain.
Figure 10:
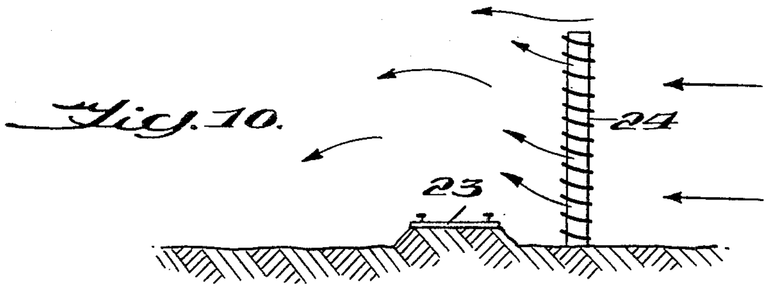

FIGS. 8–10 have been included to show various types of terrain and conditions where the improved protective fencing in accordance with the invention would prevent the drifting or accumulation of snow, sand, or other particles in the right-of-way.

In FIG. 8, the right-of-way illustrated by the railway track 16 is seen to be located in a step cut 17 in the terrain and the improved, curved vane fencing 18 is located adjacent the high side of the cut and serves to deflect the airborne particles causing them to remain in suspension over the cut, the prevailing direction of the wind being from right to left as indicated by the arrows.

In FIG. 9, the right-of-way illustrated again by track 19 is seen to be located at the bottom of a more shallow cut 20. Here, two lines of curved-vane protective fencing are employed. One line of fencing 21 located at the ridge of the cut is arranged with the vanes curving downwardly between the leading and trailing edges in order to keep eddy currents from allowing precipitation of the airborne particles. The second line of fencing 22 located at a lower level adjacent the track 19 is provided with upwardly curved vanes to maintain the particles in suspension over the track in the direction from right to left.

In FIG. 10, the right-of-way in the form of track 23 is located on essentially level terrain and the curved-vane protective fencing 24 is located adjacent the track so as to maintain the particles in suspension across the track in the direction from right to left for deposit out of the air at a safe distance beyond the track.

I claim:

1. Protective fencing for use in protecting a right-of-way against accumulation thereon of airborne particles such as snow, sand or the like which comprises an assembly of horizontally arranged upwardly curved vanes, the vane curvature being continuous between the leading and trailing edges thereof, the radius of curvature being not less than a value $R_{min.}$ established by the relationship $$R_{\text{min.}}=\frac{2s_{\text{p}}T}{C_{\text{D}}s_{\text{a}}}$$

wherein:

$s_a$=air density
$s_p$=particle density
T=particle thickness
$C_D$=drag coefficient based upon the frontal area of the particle and the total turning angle of the vane being less than 90° but sufficient to impart an aerodynamic lift to the particles at least equal to the weight thereof, and means mounting said vanes each above the other and with the trailing edge of one vane being located at least as high as the leading edge of the vane next above to ensure complete deflection of the incident air stream thereby to maintain said particles in suspension immediately downwind of the fencing and across the right-of-way.

2. Protective fencing as defined in claim 1 wherein the trailing edge of one curved vane is located at the same general level as the leading edge of the curved vane next above.

3. Protective fencing as defined in claim 1 wherein said curved vanes are stationary and are made throughout from a relatively rigid material.

4. Protective fencing as defined in claim 1 wherein the absolute turning angle $\gamma$ for the incident air stream as established by the curved vanes conforms to the equation:

$$\gamma = \sin^{-1}\left\{\frac{2s_p T}{C_D s_a V^2}\right\} + \beta$$

wherein:

$s_a$=air density
$s_p$=particle density
T=particle thickness
$C_D$=drag coefficient based upon the frontal area of the particle
V=wind velocity
$\beta$=incident or upwind air flow angle with respect to the horizontal.

5. Protective fencing as defined in claim 1 wherein said curved vanes are stationary, the leading and trailing edge portions of each vane being made from a relatively rigid material and the mid-portion thereof being made from a relatively flexible material which undergoes deflection in accordance with a change in the angle of attack of the air stream.

6. Protective fencing as defined in claim 1 wherein said curved vanes are mounted for pivotal movement about a horizontal axis, and wherein said vanes include means biasing them to a position from which they are movable about their pivots in accordance with a change in the angle of attack of the air stream.

7. Protective fencing as defined in claim 6 wherein said biasing means for each said vane is constituted by an eccentrically placed weight thereon.

8. Protective fencing as defined in claim 1 wherein the overall height $h$ thereof is determined by the area of the right-of-way at the downwind side of the fencing desired to be protected and conforms to the equation:

$$h = l \tan \gamma$$

$l$=downwind dimension of the area to be protected
$\gamma$=absolute turn angle of fence structure with respect to the horizontal.

References Cited

UNITED STATES PATENTS

| | | | |
|---|---|---|---|
| 1,902,783 | 3/1933 | Kruckenberg et al. | 256—12.5 X |
| 2,726,830 | 12/1955 | Brown et al. | 256—12.5 X |
| 2,826,382 | 3/1958 | Hayden | 256—12.5 X |
| 3,080,937 | 3/1963 | Garbell | 256—12.5 X |

FOREIGN PATENTS

| | | |
|---|---|---|
| 165,859 | 1/1959 | Sweden. |

DENNIS L. TAYLOR, Primary Examiner

U.S. Cl. X.R.

244—114